United States Patent
Ekbote et al.

(10) Patent No.: US 10,129,359 B2
(45) Date of Patent: Nov. 13, 2018

(54) METHODS AND APPARATUS TO SELECTIVELY PROVIDE CACHED AND PRESENTLY COMPILED APPLICATIONS

(71) Applicant: GOOGLE INC., Mountain View, CA (US)

(72) Inventors: Chirantan Ekbote, Sunnyvale, CA (US); Ben Cheng, Taipei (TW)

(73) Assignee: GOOGLE LLC, Mountain View, CA (US)

(*) Notice: Subject to any disclaimer, the term of this patent is extended or adjusted under 35 U.S.C. 154(b) by 198 days.

(21) Appl. No.: 15/001,964

(22) Filed: Jan. 20, 2016

(65) Prior Publication Data
US 2017/0208150 A1    Jul. 20, 2017

(51) Int. Cl.
| | | |
|---|---|---|
| *H04L 9/32* | (2006.01) | |
| *H04L 29/08* | (2006.01) | |
| *H04L 9/06* | (2006.01) | |
| *G06F 8/41* | (2018.01) | |
| *G06F 8/60* | (2018.01) | |

(Continued)

(52) U.S. Cl.
CPC ............ *H04L 67/2842* (2013.01); *G06F 8/41* (2013.01); *G06F 8/60* (2013.01); *G06F 21/12* (2013.01); *H04L 9/0643* (2013.01); *H04L 67/1097* (2013.01)

(58) Field of Classification Search
CPC ............ H04L 67/1097; H04L 67/2842; H04L 9/0643; G06F 21/12; G06F 8/41; G06F 8/60; G06F 21/53; G06F 9/44521; G06F 9/5055; G06F 2209/509
USPC ........ 717/140, 148, 136, 138, 139, 145, 146, 717/147, 149, 151, 153; 713/168
See application file for complete search history.

(56) References Cited

U.S. PATENT DOCUMENTS

| | | | |
|---|---|---|---|
| 6,370,687 B1* | 4/2002 | Shimura | G06F 8/52 709/203 |
| 7,934,104 B2* | 4/2011 | Jones | G06F 21/125 713/176 |
| 2003/0182626 A1 | 9/2003 | Davidov et al. | |

(Continued)

FOREIGN PATENT DOCUMENTS

WO    2014/176587 A2    10/2014

OTHER PUBLICATIONS

Alexander-Bown, "Android Security: Adding Tampering Detection to Your App", Airpair, (https://www.airpair.com/android/posts/adding-tampering-detection-to-your-android-app), Oct. 21, 2015, 10 pages.

(Continued)

*Primary Examiner* — Gary S Gracia
(74) *Attorney, Agent, or Firm* — Brake Hughes Bellermann LLP (57) ABSTRACT

Example methods, apparatus and articles of manufacture to selectively provide cached and presently compiled applications are disclosed. An example method includes receiving a request for an application from a device, querying a cache of pre-compiled applications based on the request for the application, if a pre-compiled version of the requested application is found in the cache, sending the pre-compiled requested application to the device; and if a pre-compiled version of the requested application is not found in the cache, thereupon compiling the requested application, and sending the compiled requested application to the device.

17 Claims, 5 Drawing Sheets

(51) Int. Cl.
*G06F 21/12* (2013.01)
*G06F 21/00* (2013.01)

(56) References Cited

U.S. PATENT DOCUMENTS

| | | | | |
|---|---|---|---|---|
| 2004/0181788 | A1* | 9/2004 | Kester | G06F 21/50 |
| | | | | 717/168 |
| 2007/0240136 | A1* | 10/2007 | Garyali | G06F 9/468 |
| | | | | 717/140 |
| 2007/0245323 | A1* | 10/2007 | Bertelrud | G06F 8/41 |
| | | | | 717/140 |
| 2009/0055810 | A1* | 2/2009 | Kondur | G06F 8/41 |
| | | | | 717/140 |
| 2009/0288077 | A1* | 11/2009 | Miranda-Steiner | G06F 8/65 |
| | | | | 717/173 |
| 2010/0313079 | A1* | 12/2010 | Beretta | G06F 9/5055 |
| | | | | 714/48 |
| 2010/0313189 | A1* | 12/2010 | Beretta | G06F 9/45516 |
| | | | | 717/148 |
| 2011/0093701 | A1* | 4/2011 | Etchegoyen | G06F 21/121 |
| | | | | 713/165 |
| 2014/0013054 | A1* | 1/2014 | Chang | G06F 12/0895 |
| | | | | 711/122 |

OTHER PUBLICATIONS

Invitation to Pay Additional Fees and Partial Search Report received for PCT Patent Application No. PCT/US2016/067828, dated Mar. 14, 2017, 5 pages.

International Search Report and Written Opinion received received for PCT Patent Application No. PCT/US2016/067828, dated May 15, 2017, 16 pages.

* cited by examiner

METHODS AND APPARATUS TO SELECTIVELY PROVIDE CACHED AND PRESENTLY COMPILED APPLICATIONS

FIELD OF THE DISCLOSURE

This disclosure relates generally to applications, and, more particularly, to methods, apparatus and articles of manufacture to selectively provide cached pre-compiled applications and presently compiled applications.

BACKGROUND

Conventional user devices, such as mobile and stationary consumer electronics devices, have stored thereon applications and files that allow a person to perform functions such as viewing media files, viewing websites, editing documents, composing and viewing messages, communicating with others, etc.

SUMMARY

Example methods, apparatus and articles of manufacture to selectively provide cached and presently compiled applications are disclosed. An example method includes receiving a request for an application from a device, querying a cache of pre-compiled applications based on the request for the application, if a pre-compiled version of the requested application is found in the cache, sending the pre-compiled requested application to the device; and if a pre-compiled version of the requested application is not found in the cache, thereupon compiling the requested application, and sending the compiled requested application to the device.

An example apparatus includes an interface configured to receive a request for an application from a device, a cache storing a plurality of pre-compiled applications, a querier configured to query the cache based on a parameter contained in the request, a compiler, and an application manager configured to if a pre-compiled version of the requested application is found in the cache, send the pre-compiled requested application to the device via the interface, responsive to not finding a pre-compiled version of the requested application in the cache, direct the compiler to compile the requested application, and send the compiled requested application to the device via the interface.

A tangible article of manufacture storing machine-readable instructions that, when executed, cause a machine to at least receive a request for an application from a device query a cache of pre-compiled applications based on the request for the application, determine whether a pre-compiled version of the requested application applicable to the device is found in the cache, if found in the cache, send the pre-compiled requested application to the device, and if an applicable pre-compiled requested application is not found in the cache, then compile the requested application to form an applicable compiled requested application, and send the compiled requested application to the device.

DETAILED DESCRIPTION

After, for example, a system update, crash or reboot, some conventional devices start locally compiling and optimizing their locally stored applications, which are sometimes referred to simply as apps. This, however, may result in an undesirable wait time because every application need be recompiled and optimized, and some central processing units (CPUs), especially those in mobile or older devices, may have relatively low processing capabilities.

Further, there can be security problems because there are no guarantees for the integrity of the compiled code. For example, an attacker who gains access to a user's storage medium may be able to modify a device's machine code, often without detection.

Further still, in some instances, users, vendors and manufactures are allowed to modify core or system libraries, and operating system (OS) kernel components. Moreover the large number of device combinations based on device, architecture, vendor, OS version, system library(-ies), kernel components, etc. have traditionally made it difficult to perform server-side compilation.

Servers are disclosed herein that overcome at least these problems by compiling applications on-the-fly as requested by a user, and maintaining a fixed-size cache of compiled applications. For example, if the compiled binary of an application for a particular device configuration (e.g., a particular CPU architecture, OS version combination) doesn't exist in the cache, the server will compile the application and put the resultant compiled application in the cache, potentially evicting compiled versions of that or other applications. By caching pre-compiled applications, a server constructed in accordance with the disclosure can reduce the number of compilations needing to be performed by the server as applications are requested. Moreover, because the server compiles the application instead of the device, the risk of security breaches can be reduce. Example compiled applications include binary, machine-executable data, etc. Example un-compiled applications include source code, interpretative language code, etc.

In some examples, the number of compiled applications that must be stored in the cache can be reduced by controlling or limiting the number of device combinations via pushed operating system updates and by controlling device and CPU architectures.

In some examples disclosed herein, server-side compiled applications are cryptographically protected. For example, boot-time verification may be used to verify received compiled applications. In some examples, server-side compiled applications, together with corresponding hash vales, are cryptographically encrypted using a private encryption key forming encrypted files, and the cryptographically encrypted files are provided to the device(s). A device can decrypt a received file using their corresponding public key to obtain the compiled application and the hash, and then verify the integrity of the compiled application by comparing a locally computed hash of the compiled application and the received hash.

In this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Additionally, connecting lines and connectors shown in the various figures presented are intended to represent exemplary functional relationships and/or physical or logical couplings between the various elements. It should be noted that many alternative and/or additional functional relationships, physical connections or logical connections may be present. Moreover, no item or component is essential to the practice of this disclosure unless the element is specifically described as "essential" or "critical".

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Figure 1:
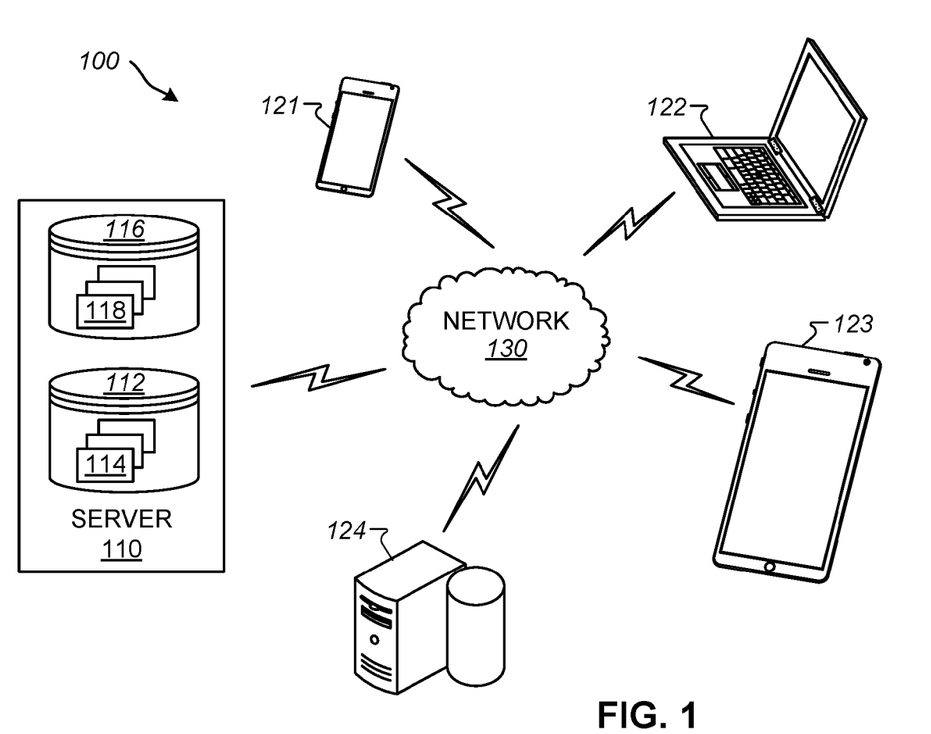
FIG. 1 is a schematic illustration of an example system having a server constructed in accordance with the teachings of this disclosure to selectively provide pre-compiled cached applications and presently compiled applications.

FIG. 1 is a schematic illustration of an example system 100 having a server 110 constructed in accordance with the teachings of this disclosure. The server 100 is communicatively coupled to a plurality of devices 121-124 via a network 130. While four devices are shown in the example FIG. 1, any number of user devices may be present in practice. In the example of FIG. 1, the devices 121-124 are any number and/or type(s) of consumer or user computing or electronic devices such as, but not limited to, a mobile device 121 (e.g., a smartphone, a personal digital assistant, a portable media player, etc.), a laptop or netbook 122, an electronic tablet 123, a desktop computer 133, a camera, a smart watch, a television, a thermostat, an appliance, an automobile, a gaming device or console, and any other electronic or computing device that can communicate with the server 110 via the network 130. For ease of discussion, the devices 121-124 are described herein as user devices, client devices or just devices to differentiate them from the example server 110, which provides compiled applications to the devices 121-124 upon request of the devices 121-124. In that way, the devices 121-124 are clients relative to the server 110. It should be understood that the devices 121-125 may themselves be a server or provide services to other devices.

The example network 130 may be constructed using any number and type(s) of private and/or public networks, protocols, devices, interfaces, etc. including, but not limited to, those associated with the Internet, a cellular network, a coaxial cable network, a fiber optic network, a satellite network, a dialup or broadband modem over a twisted-pair copper wire telephone network, a Wi-Fi® hotspot, a private communications network (e.g., a private local area network (LAN), a private wireless local area network (WLAN), an Ethernet over Power network, a leased line), a local connection such as via Bluetooth® or Universal Serial Bus (USB), etc. Further, while wireless connections are shown in FIG. 1, any of the server 110 and the devices 121-124 may be additionally or alternatively communicatively coupled to the network 130 using wired connections. Further still, any of the server 110 and the devices 121-124 may be communicatively coupled directly to each other via wired and wireless connections.

As will be described in more detail below in connection with FIG. 4, the example server 110 has a cache 112 of pre-compiled applications 114, and a database 116 of un-compiled applications 118. The pre-compiled applications 114 may be stored in the cache 112 using any number and/or type(s) of structures, files, entries, tables, etc. The cache 112 may be constructed using any number, combination and/or type(s) of computer-readable storage medium. The un-compiled applications 118 may be stored in the database 116 using any number and/or type(s) of structures, files, entries, tables, etc. The database 116 may be constructed using any number, combination and/or type(s) of computer-readable storage media. In some examples, a portion or all of the database 116 is implemented by an online marketplace or store of digital goods. In some examples, the pre-compiled applications 114 are stored in the cache 112 as encrypted files that each include a pre-compiled application 114 and a corresponding hash computed over the pre-compiled application 114. Additionally or alternatively, pre-compiled applications 114 may have hashes computed and be encrypted when they are being sent to a device 121-124.

While the cache 112 and the database 116 are shown as implemented together with the server 110, one or more of them may be implemented separately or remotely from the server 110. Moreover, the cache 112 and the database 116 may be implemented together. Further, the cache 112 and the database 116 may be constructed to include local or remote redundancy. Further still, more than one server 110 may be implemented within the same or different housing or rack.

Figure 2:
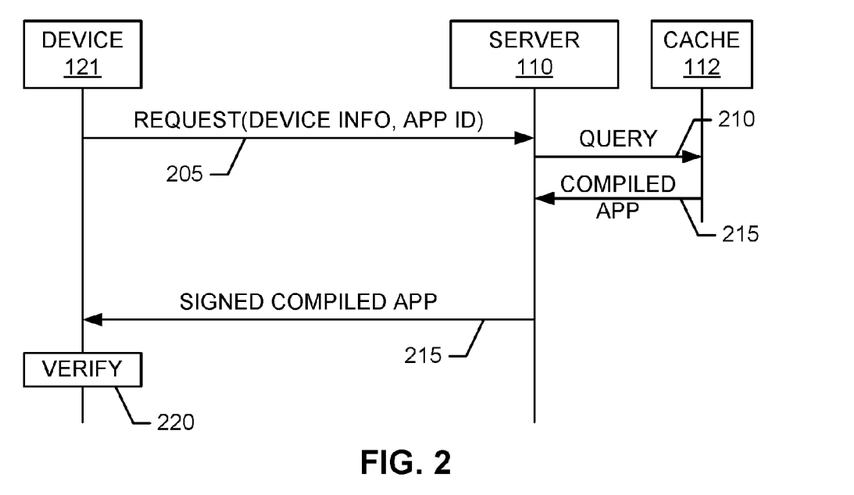
FIGS. 2 and 3 are diagrams illustrating example interactions between a device and the example server of FIG. 1 to selectively provide pre-compiled cached applications and presently compiled applications.

Turning to FIG. 2, an example diagram illustrating an example interaction that may be carried out by the example system 100 of FIG. 1 is shown. In the example of FIG. 2, reference is made to the example device 121 of FIG. 1, however any device could be used in the example interaction of FIG. 2.

The example interaction of FIG. 2 begins with the device 121 sending a request 205 to the example server 110 of FIG. 1. The request 205 identifies a requested application and provides configuration information sufficient to allow an applicable compiled version of the requested application to be provided by the server 110 to the device 121. Example information includes, but is not limited to, one or more parameters or values representing a system library, an operating system, a manufacturer, a device model, a processor architecture, etc.

The server 110 queries 210 the cache 112 to determine whether a pre-compiled application 215 corresponding to the request 205 and applicable to the device 121 is stored in the cache 112. When, as shown in FIG. 2, an applicable pre-compiled application 215 is found in the cache 112, the server 110 sends the identified pre-compiled application 215 to the device 121. In some examples, at block 220 the device 121 receives the pre-compiled application 215 in an encrypted form or file that the device 121 decrypts using a public decryption key, and then verifies the contained pre-compiled application 215 using a hash contained in the file and a locally computed hash.

Figure 3:
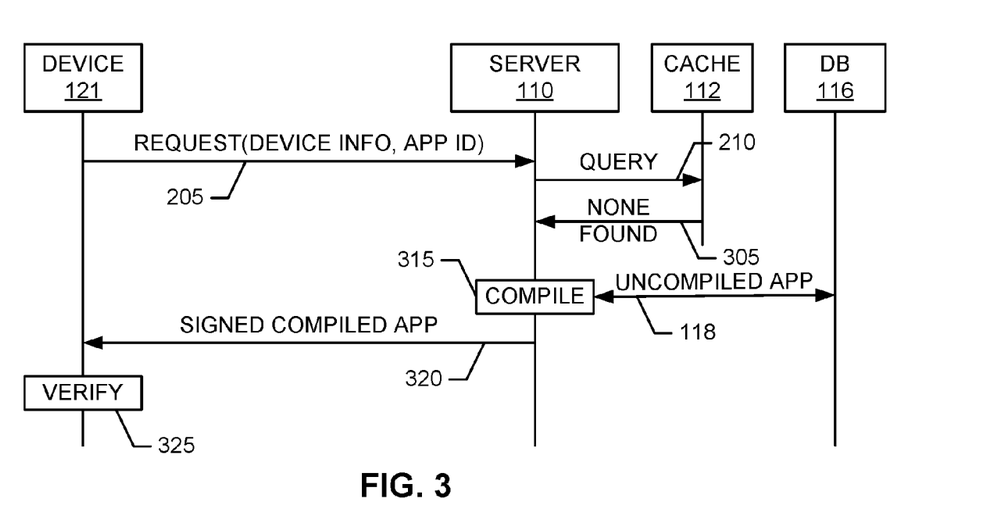

FIG. 3 is another example diagram illustrating another example interaction that may be carried out by the example system 100 of FIG. 1. In FIG. 3, the query 120 returns an applicable application not found response 305. In response to the application not found response 305, the server 110 obtains 310 an un-compiled version 118 of the requested application from the database 116. At block 315 the server 110 compiles the obtained un-compiled version 118 to form a compiled application 320 applicable to the device 121. The server 110 sends the just compiled application 320 to the device 121.

Because in FIGS. 2 and 3 the server 110 queries the cache 112 for a pre-compiled applicable application and then, if necessary, compiles the application, the server 110 is selectively providing pre-compiled and presently compiled applications. Because they are compiled at the time when they are requested, the applications that are compiled because they are not in the cache 112 are referred to herein as presently compiled applications. The use of presently or equivalents thereof (e.g., thereupon, responsive to, etc.) does not require or imply that a particular maximum time between request and compilation be satisfied, only that the app is compiled in response to the request. Once stored in the cache 112, the compiled app (now a pre-compiled app) does not require compilation in response to a subsequent request, as it is already in its compiled form. If the now pre-compiled app were ejected from the cache 112, a subsequent request would trigger the generation of another presently compiled application.

In some examples, the server 110 computes a hash of the compiled application and encrypts a combination of the compiled application and the hash using a private encryption key forming an encrypted file. The server 110 sends the encrypted file containing the compiled application and the hash to the device 121. At block 325, the device 121 decrypts the file 320 using a public decryption key and verifies the presently compiled application using the received hash and a locally computed hash of the presently compiled application.

Figure 4:
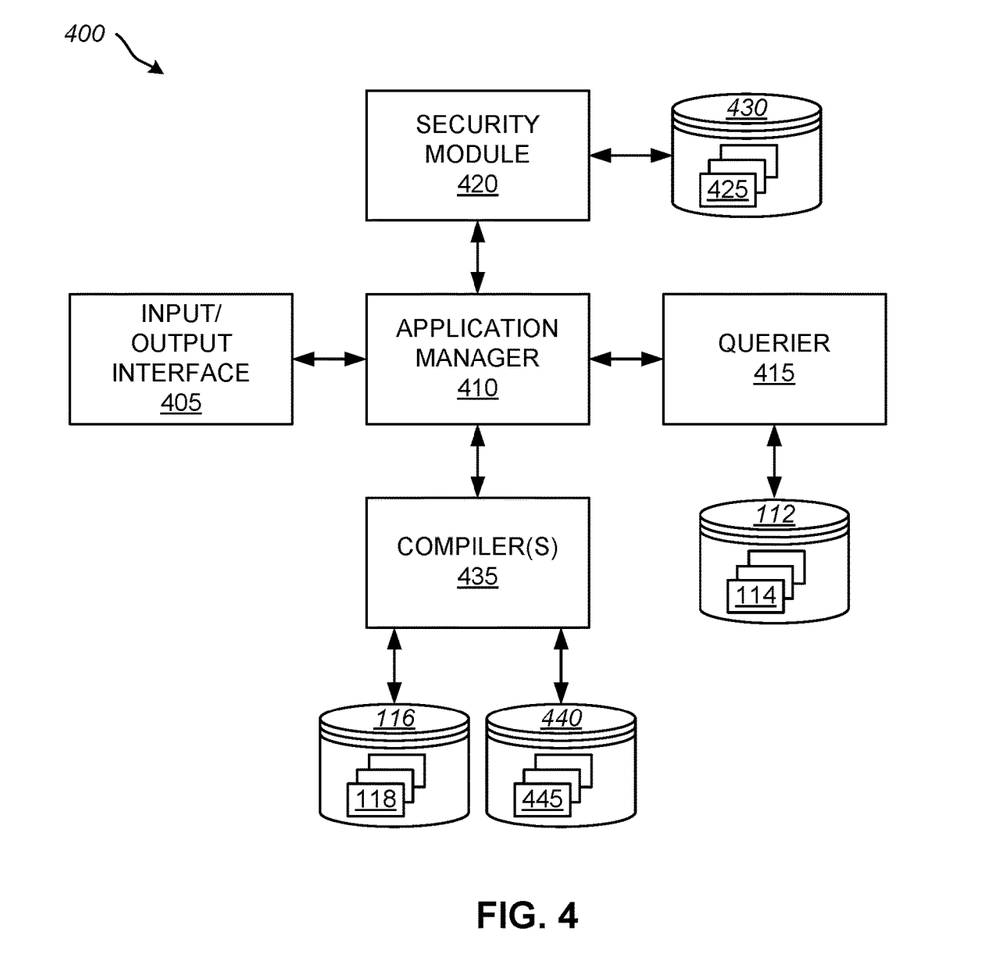
FIG. 4 is a schematic illustration of an example manner of constructing the example server of FIG. 1.

FIG. 4 is a schematic diagram of an example server 400 that may be used to implement the example server 110 of FIGS. 1-3. To receive requests for compiled applications from a device 121-124, and send compiled applications to the device 121-124, the example server 400 includes an input/output interface 405. The example interface 405 may be constructed using any type(s) of devices, protocols, etc. compatible with the network 130 and the devices 121-124 for communicating information.

To manage and respond to requests for compiled applications, the example server 400 includes an application manager 410. When a request for an applicable compiled application is received, the application manager 410 directs or instructs a querier 415 to query the cache 112 for a pre-compiled application 114 corresponding to the requested application and applicable to the requesting device 121-124. If an applicable pre-compiled application is found by the querier 415, the application manager 410 returns the pre-compiled application to the device 121-124 via the interface 405.

To cryptographically protect (pre-)compiled applications, the example server 400 of FIG. 4 contains a security module 420. To cryptographically protect a (pre-)compiled application, the security module 420 computes a hash of the (pre-)compiled application using, for example, a secure hash algorithm such as SHA-256. A combination of the (pre-)compiled application and the hash is encrypted using a private key known only to the security module 420 and/or the server 400, forming an encrypted file. In some examples, the combination is a concatenation of the (pre-)compiled application and the hash. A device 121-124 can verify a received (pre-)compiled application by decrypted the file using a public key to extract the (pre-)compiled application and the hash. The integrity of the (pre-)compiled application can be verified using the hash and a locally computed hash computed over the extracted, (pre-)compiled application. In some examples, the verification is performed using a comparison. It should be appreciated that other methods of protecting and verifying the integrity of (pre-)compiled applications may be used.

In some examples, different private keys may be used for protecting different (pre-)compiled applications. In such examples, the private keys 425 may be stored in a database 430 using any number and/or type(s) of structures, files, entries, tables, etc. The database 430 may be constructed using any number, combination and/or type(s) of computer-readable storage media.

To compile applications, the example server 400 of FIG. 4 includes one or compiler(s) 435. The example compiler(s) 435 compile and optimize applications to form (pre-)compiled applications. In some examples, different compilers 435 are included to support different types of devices, different operating systems, different source languages, etc.

Because whether a (pre-)compiled application is applicable to a device 121-124 depends on a variety of variables associated with the device 121-124, the example server 400 includes a database 440 of configuration information, parameters, data, files, etc. 445 that may be needed to compile an application applicable to a particular device 121-124. Example information 445 includes, but is not limited to, information representing a system library, an operating system, a manufacturer, a device model, and/or processor architecture. The information 445 may be stored in the database 440 using any number and/or type(s) of structures, files, entries, tables, etc. The database 440 may be constructed using any number, combination and/or type(s) of computer-readable storage media.

One or more of the example elements and interfaces shown in FIG. 4 may be combined, divided, re-arranged, omitted, eliminated and/or implemented in any other way. Further, the elements and interfaces of FIG. 4 may be implemented by the example computing device P00 of FIG. 6, and/or one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. Further still, the example server 400 may include interfaces and/or elements instead of, or in addition to, those shown in FIG. 4, and/or may include more than one of any or all of the illustrated interfaces and elements. If any claim of this patent incorporating one or more of these elements is read to cover a purely software and/or firmware implementation, at least one of these elements and/or, more generally, the example server 400 is hereby expressly defined to include a tangible article of manufacture such as a tangible machine-readable medium storing machine-readable instructions such as the firmware and/or software.

Any of the interface 405, the application manager 410, the querier 415, the security module 420, and, more generally, the server 400 may, for example, be implemented as machine-readable instructions carried out by one or more processors. A processor, a controller and/or any other suitable processing device such as those shown in FIG. 6 may be used, configured and/or programmed to execute and/or carry out the example of FIG. 4. For example, the server 400 of FIG. 4, or any component thereof, may be embodied in program code and/or machine-readable instructions stored on a tangible and/or non-transitory computer-readable medium accessible by a processor, a computer and/or other machine having a processor, such as that discussed below in connection with FIG. 6. Machine-readable instructions comprise, for example, instructions that cause a processor, a computer and/or a machine having a processor to perform one or more particular processes. Many other methods of implementing the example of FIG. 4 may be employed. For example, the order of execution may be changed, and/or one or more of the blocks and/or interactions described may be changed, eliminated, sub-divided, or combined. Additionally, any or the entire example of FIG. 4 may be carried out sequentially and/or carried out in parallel by, for example, separate processing threads, processors, devices, discrete logic, circuits, etc.

Figure 5:
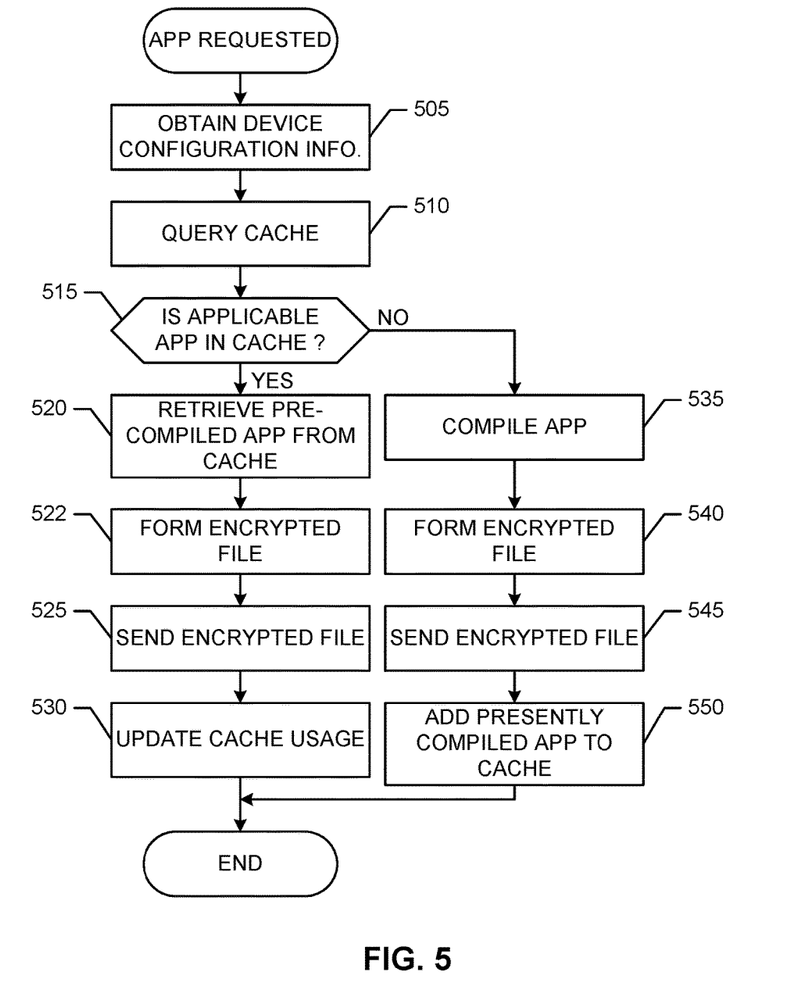
FIG. 5 is a flowchart illustrating an example method that may be, for example, implemented using machine-readable instructions executed by one or more processors, to implement the example servers of FIGS. 1-4.

FIG. 5 is an example method that may be carried out by a server such as the example server 110 and the example server 400 to selectively provide cached pre-compiled applications and presently compiled applications. The example method of FIG. 5 begins when a request for an application (e.g., the example request 205 of FIGS. 2 and 3) is received from a device (e.g., via the interface 405). The server (e.g., the application manager 410) obtains device configuration information from the request (block 505). Example configuration information includes, but is not limited to, information representing a system library, an operating system, a manufacturer, a device model, a processor architecture, etc.

The server (e.g., the example querier 415) queries a cache (e.g., the example cache 112 of FIG. 1) to determine whether a pre-compiled version of the requested application applicable to the device is present in the cache (block 510).

If an applicable pre-compiled application is found in the cache 112 (block 515), the server retrieves the applicable pre-compiled application from the cache 112 (block 520), and, as necessary, the server 110 encrypts (block 522) the pre-compiled application retrieved from the cache 112 to form an encrypted file. The encrypted pre-compiled application is sent to the device 112 (block 525), e.g., the interface 405. As discussed above, sending the pre-compiled application may comprise sending an encrypted file containing the pre-compiled application. The pre-compiled application may be stored in the cache 112 in its pre-encrypted form or be encrypted (e.g., by the security module 420) when sent to the device 121. When the pre-compiled application is stored in the cache 112 in its encrypted form, the encrypted pre-compiled application may not need to be encrypted when an applicable encryption had been applied to the pre-compiled app is sent to the device 121. Multiple copies of the pre-compiled application may be encrypted and stored in the cache 112 for different encryption parameters, user group, device characteristics, device time, device architecture, core or OS libraries, OS kernel components, vendor, system library(-ies), kernel components etc.

Cache usage information and/or statistics are updated to facilitate future decisions regarding the eviction of pre-compiled applications from the cache 112 (block 530). Any number of methods may be used to track cache usage and/or hits, and to determine when to eject a particular pre-compiled application. Control then exits from the example method of FIG. 5.

Returning to block 515, if an applicable pre-compiled application is not found in the cache (block 515), the server (e.g., the compiler(s) 435) presently compiles the application (block 535). The server (e.g., the security module 420) computes a hash over the presently compiled application, and encrypts a combination (e.g., a concatenation) of the compiled application and the hash using, for example, a private encryption key to form an encrypted file (block 540). The presently compiled application is sent to the device 121 via, for example, the interface 405 as the encrypted file (block 545). In some examples, the presently compiled application or its encrypted form is added to the cache (block 550). Alternatively, presently compiled applications may be selectively added based on the occurrence rate of particular configuration information. The cache 112 may store other encrypted versions of the presently compiled applications that may not be applicable to the device 121 because the cache 112 may not store an encrypted version of the applications applicable to the device 121. Control then exits from the example method of FIG. 5.

The example method of FIG. 5 may, for example, be implemented as machine-readable instructions carried out by one or more processors. A processor, a controller and/or any other suitable processing device such as that shown in FIG. 6 may be used, configured and/or programmed to execute and/or carry out the example method of FIG. 5. For example, the example method of FIG. 5 may be embodied in program code and/or machine-readable instructions stored on a tangible and/or non-transitory computer-readable medium accessible by a processor, a computer and/or other machine having a processor, such as that discussed below in connection with FIG. 6. Machine-readable instructions comprise, for example, instructions that cause a processor, a computer and/or a machine having a processor to perform one or more particular processes. Many other methods of implementing the example method of FIG. 5 may be employed. For example, the order of execution may be changed, and/or one or more of the blocks and/or interactions described may be changed, eliminated, sub-divided, or combined. Additionally, any or the entire example methods of FIG. 5 may be carried out sequentially and/or carried out in parallel by, for example, separate processing threads, processors, devices, discrete logic, circuits, etc.

As used herein, the term "computer-readable medium" is expressly defined to include any type of computer-readable medium and to expressly exclude propagating signals. Example computer-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Figure 6:
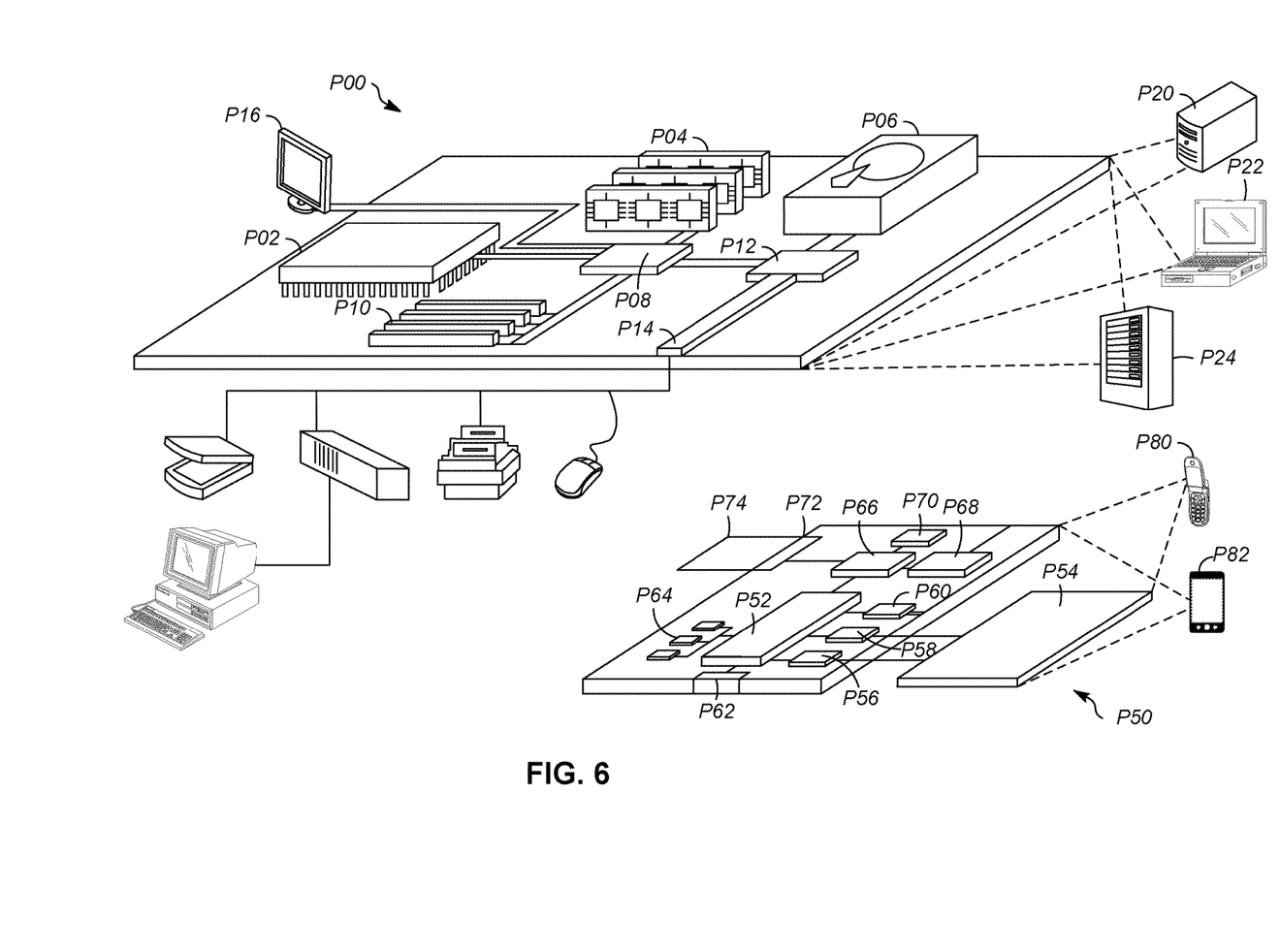
FIG. 6 is a block diagram of an example computer device and an example mobile computer device, which may be used to implement the examples disclosed herein.

FIG. 6 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a graphical user interface (GUI) on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, Global Positioning System (GPS) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASIC(s), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, PLD(s) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a cathode ray tube (CRT) or an LCD monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   receiving, by a server, a request for an application from a device that is separate from the server;
   determining configuration information of the device;
   querying a cache of pre-compiled applications based on the configuration information for a pre-compiled version of the application that is applicable to the device;
   if a pre-compiled version of the requested application is found in the cache, sending to the device an encrypted file that includes a combination of the pre-compiled version of the requested application and a hash of the pre-compiled version of the requested application; and
   if a pre-compiled version of the requested application is not found in the cache:
     compiling the requested application;
     computing a hash of the compiled requested application;
     encrypting a combination of the compiled requested application and the hash using a private encryption secret to form an encrypted file; and
     sending the encrypted file to the device.

2. The method of claim 1, further comprising determining whether to retain the compiled requested application in the cache based on at least one of an available storage space in a computer-readable storage medium, a number of requests for the application, a system library version, an operating system version, a device model, and/or a processor architecture.

3. The method of claim 1, further comprising determining whether to retain the compiled requested application in the cache to increase a likelihood that future requests for applications will result in pre-compiled versions being found in the cache.

4. The method of claim 1, further comprising:
   receiving another request for the application from another device;

querying the cache based on the another request for the application; and determining whether to send a pre-compiled version of the application or another compiled version of the requested application to the other device separate from whether a pre-compiled version of the application is sent to the device.

5. The method of claim 4, wherein the device and the other device differ in at least one of a system library, an operating system, a manufacturer, a device model, and/or a processor architecture, and wherein the difference is associated with different pre-compiled versions of the requested application in the cache.

6. The method of claim 1, wherein the querying of the cache is based in part on a configuration parameter associated with the device.

7. The method of claim 6, wherein pre-compiled versions of the requested application are stored in the cache for respective values of the configuration parameter.

8. The method of claim 6, wherein the parameter represents at least one of a system library, an operating system, a manufacturer, a device model, and/or a processor architecture.

9. The method of claim 1, further comprising:
computing a hash of the pre-compiled version of the requested application; and
encrypting a combination of the version of the pre-compiled requested application and the hash using a private encryption secret to form the encrypted file.

10. An apparatus comprising:
an interface device configured to receive a request for an application from a device that is separate from the apparatus and determine configuration information of the device;
a cache storing a plurality of pre-compiled applications;
a querier device configured to query the cache based on the configuration information for a pre-compiled version of the application that is applicable to the device;
a compiler; and
an application manager device configured to:
if a pre-compiled version of the requested application is found in the cache, send to the device, via the interface device, an encrypted file that includes a combination of the pre-compiled version of the requested application and a hash of the pre-compiled version of the requested application; and
responsive to not finding a pre-compiled version of the requested application in the cache:
direct the compiler to compile the requested application;
compute a hash of the compiled requested application;
encrypt a combination of the compiled requested application and the hash using a private encryption secret to form an encrypted file; and
send the encrypted file to the device via the interface device.

11. The apparatus of claim 10, further comprising:
a first computer-readable storage medium storing a plurality of system libraries; and
a second computer-readable storage medium storing a plurality of uncompiled applications;
wherein the compiler:
obtains a system library from the first storage medium based on the configuration information;
obtains an uncompiled version of the requested application from the second storage medium; and
compiles the uncompiled version using the system library to form the compiled requested application.

12. The apparatus of claim 10, further comprising a security module that:
computes a hash of the compiled requested application; and
encrypts a combination of the compiled requested application and the hash using a private encryption secret to form encrypted data,
wherein the sending the compiled requested application comprises sending the encrypted data.

13. The apparatus of claim 12, wherein the pre-compiled version of the requested application is stored in the cache as the encrypted file.

14. The apparatus of claim 10, wherein:
the querier device queries the cache based on a another request for the application received from another device via the interface; and
the application manager device determines whether to send a pre-compiled version of the application or another compiled version of the requested application to the other device separate from whether a pre-compiled version of the application is sent to the device.

15. A computer-readable medium storing machine-readable instructions that, when executed, cause a machine to at least:
receive a request for an application from a device that is separate from the machine;
determine configuration information of the device;
query a cache of pre-compiled applications based on the configuration information for a pre-compiled version of the application that is applicable to the device;
determine whether a pre-compiled version of the requested application applicable to the device is found in the cache;
if found in the cache, send to the device an encrypted file that includes a combination of the pre-compiled version of the requested application and a hash of the pre-compiled version of the requested application; and
if an applicable pre-compiled requested application is not found in the cache:
compile the requested application to form an applicable compiled requested application;
compute a hash of the compiled requested application;
encrypt a combination of the compiled requested application and the hash using a private encryption secret to form an encrypted file; and
send the encrypted file to the device.

16. The computer-readable medium of claim 15, wherein the machine-readable instructions, when executed, cause the machine to additionally determine whether a pre-compiled application is applicable based on at least one of a system library, an operating system, a manufacturer, a device model, and/or a processor architecture.

17. The computer-readable medium of claim 15, wherein the machine-readable instructions, when executed, cause the machine to additionally:
receive another request for the application from another device;
query the cache based on the another request for the application; and
determine whether to send a pre-compiled version of the application or another compiled version of the requested application to the other device separate from whether a pre-compiled version of the application is sent to the device.

* * * * *